United States Patent

[11] 3,622,120

| [72] | Inventor | Alfred Racek |
| | | Zwerngasse 59, 1170 Vienna, Austria |
| [21] | Appl. No. | 873,835 |
| [22] | Filed | Nov. 4, 1969 |
| [45] | Patented | Nov. 23, 1971 |
| [32] | Priority | Nov. 4, 1968 |
| [33] | | Austria |
| [31] | | A 10702/68 |

[54] VALVED GAS TANK FOR A GAS-FUELLED LIGHTER
4 Claims, 1 Drawing Fig.

[52] U.S. Cl. ................................. 251/144,
431/344, 138/43, 137/625.3, 137/599
[51] Int. Cl. .................................... F23d 13/04,
F23g 2/42
[50] Field of Search .............................. 251/121,
335.1; 138/43; 137/625.3; 431/344, 130, 131

[56] References Cited
UNITED STATES PATENTS

| 2,136,940 | 11/1938 | Ehbrecht | 251/335.1 X |
| 2,629,576 | 2/1953 | Rudolph | 251/335.1 X |
| 3,213,649 | 10/1965 | Sakamoto | 431/344 |
| 3,315,496 | 4/1967 | Newman | 251/121 X |
| 3,399,951 | 9/1968 | Koizumi | 431/344 |

FOREIGN PATENTS

| 1,094,152 | 1954 | France | 431/344 |

Primary Examiner—Arnold Rosenthal
Attorney—Waters, Roditi, Schwartz and Nissen

ABSTRACT: A gas tank body defines an internal gas chamber. Means are provided which define a gas flow path from said chamber to the outside of said body and comprise an adjusting member, which is adjustable relative to said body and formed with passage means which constitute part of said gas flow path. A compressible pourous throttling member is disposed in said gas flow path and operatively connected to said throttling member and adjustable to control the compression of said throttling member. Sealing means are provided, which seal said adjusting member in said body and comprise a diaphragm extending around said adjusting member, inner gripping means cooperating with said adjusting member to grip said diaphragm, and outer gripping means which grip said diaphragm radially outwardly of said adjusting member.

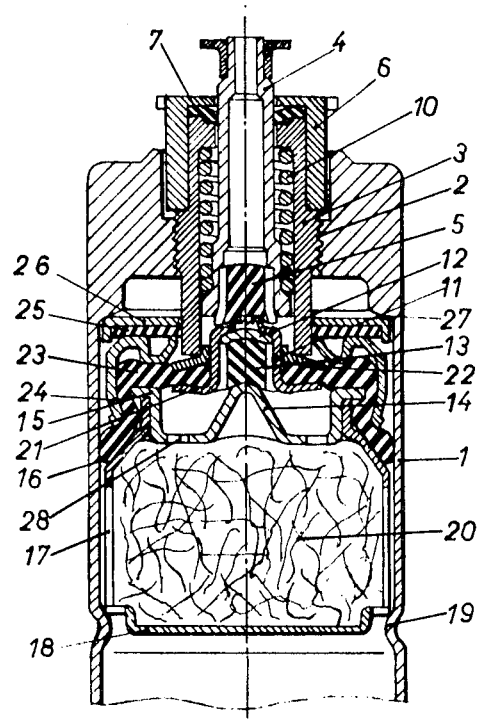

VALVED GAS TANK FOR A GAS-FUELLED LIGHTER

This invention relates to a valve for gas-fuelled lighters, in which valve the height of the flame can be controlled by varying the compression of a porous throttling body which lies in the gas flow path and on which pressure is exerted by an adjusting member, which is movable relative to the gas tank.

In known valves of this kind, the gas chamber below the valve is sealed from gas spaces above the valve by O-rings or by tubular or disclike seals. All these seals have the disadvantage that they may be initially subjected to an insufficient deformation so that a satisfactory sealing action will no longer be ensured by the seal when the elasticity of the seal material has decreased. Besides, the movement of the adjusting member is resisted by the external friction involved in that movement where the known seals are employed.

It is an object of the invention to provide a valve of the kind mentioned first hereinbefore with such a seal that the above-mentioned disadvantages are avoided and the seal preserves its sealing action much more reliably than any of the known seals. This object is essentially accomplished in that the gas chamber within the tank is sealed by a diaphragm, which is gripped at the adjusting member and outwardly of said adjusting member.

Where a diaphragm is used in accordance with the invention, the above-mentioned disadvantages of the known seals need not be feared because the diaphragm can be tightly gripped in any case and even a loss in elasticity of the diaphragm will not result in a loss of its sealing action. Such loss in sealing action would have to be feared only in the case of a rupture of the diaphragm and such rupture is virtually impossible. Besides, a movement of the adjusting member will involve no external friction whatever so that only the comparatively small internal friction of the diaphragm must be overcome.

Further features and advantages of the invention will be described more fully hereinafter with reference to an embodiment shown by way of example in the drawing. The invention is not restricted, however, to that example.

In the embodiment shown in the drawing, a screw thread 2 is cut into a fuel tank 1 and in threaded engagement with a hollow screw 3, which serves as a setting member. A hollow stem 4 is axially movable within the screw 3. A plug 5 having a serrated periphery is inserted in the lower end of the valve stem. A sealing disc is gripped at its outside periphery between the screw 3 and a sleeve 6 and seals the valve stem 4.

A spring 10 urges the valve stem 4 downwardly so that the plug 5 closes the gas exit opening of a cup-shaped adjusting member 11. The latter contains a porous throttling member 12 and an elastic plug 13, which has a serrated periphery. The plug 13 bears on a hump 14, which has a flange 15. A retaining member 16, which conically flares toward the tank 1, extends from the flange 15 and has webs 17, which rest on a disc 18 having a serrated periphery. The disc 18 is supported by a peripheral bead 19 formed in the tank 1. Bibulous material 20, such as felt or cotton wool, is disposed in the space between the hump 14, the retaining member 16 and the disc 18.

The cup-shaped adjusting member 11 comprises a flange 21. A ring 22 is shrunk on the adjusting member 11. The inner peripheral portion of a diaphragm 23 is gripped between the flange 21 and the ring 22. The diaphragm 23 is gripped on the outside between the flange 15 and a clamp ring 24, which bears on the flange 15 from above. The diaphragm 23 extends outwardly beyond its outer gripping means and contacts the wall of the tank 1 and the retaining member 16.

The clamp ring 24 bears on a shoulder 27 of the tank 1. A sealing disc 25 and a disc 26 are disposed between the clamp ring 24 and the shoulder 27.

The illustrated valve has the following mode of operation:

Liquefied gas is stored in the material 20 whenever the tank 1 is tilted. When the valve stem 4 has been raised by known means, gas flows through openings 28 of the hump 14 and over the serrated outside periphery of the plug 13 and then through the throttling member 12 to escape through the hollow valve stem 4. The height of the flame can be varied by a rotation of the setting member 3, which bears on the ring 22 and forces the adjusting member 11 and its plug 13 against the hump 14 so that the throttling member 12 is more or less compressed.

An escape of the gas to the outside between the flange 15 and the hump 14 is prevented by the inner portion of the diaphragm 23. An unintended escape of gas along the tank wall is prevented by the extended portion of the diaphragm 23 in contact with the tank wall.

It will be understood that numerous modifications are possible within the scope of the invention. For instance, the setting member need consist of a screw but may be axially moved by other means, e.g., by a cam. The means for conducting the gas to the throttling member and the means which grip the diaphragm may also be modified. Furthermore, the diaphragm need not be extended outwardly beyond its outer gripping means; in this case, a separate sealing ring is used as an outer seal. Nevertheless, the disadvantages pointed out first hereinbefore need not be feared because the seal is between stationary parts.

What is claimed is:

1. A gas tank for a gas-fuelled lighter, said tank comprising
   a gas tank body defining an internal gas chamber,
   means defining a gas flow path from said chamber to the outside of said body and comprising an adjusting member, which is adjustable relative to said body and formed with passage means which constitute part of said gas flow path,
   a compressible porous throttling member disposed in said gas flow path, said adjusting member being operatively connected to said throttling member and adjustable to control the compression of said throttling member,
   sealing means which seal said adjusting member in said body and comprise a diaphragm extending around said adjusting member, inner gripping means cooperating with said adjusting member to grip said diaphragm, and outer gripping means which grip said diaphragm radially outwardly of said adjusting member,
   said adjusting member being cup-shaped and formed with a flange,
   said inner gripping means comprise a ring which is shrunk on said adjusting member and cooperates with said flange to grip said diaphragm, and
   a setting member is mounted to be adjustable relative to said body and rests on said ring and is operable to adjust said adjusting member.

2. A gas tank as set forth in claim 1, in which said outer gripping means comprise
   a gripping member having a flange which extends toward said body, and
   a clamp ring which cooperates with said flange to grip said diaphragm.

3. A gas tank as set forth in claim 2, which comprises
   a retaining member which engages said gripping member and has a conical portion flaring toward said body,
   said diaphragm contacting said retaining member and said body.

4. A gas tank as set forth in claim 3, in which said body is formed with inwardly extending projections retaining said retaining member and clamp ring in said body.

* * * * *